(12) United States Patent
Schat (10) Patent No.: US 10,890,933 B2
(45) Date of Patent: Jan. 12, 2021

(54) VOLTAGE REGULATOR ERROR DETECTION AND CORRECTION

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/591,739

(22) Filed: Oct. 3, 2019

(65) Prior Publication Data

US 2020/0150704 A1    May 14, 2020

(30) Foreign Application Priority Data

Nov. 8, 2018   (EP) ..................................... 18205122

(51) Int. Cl.
| | | |
|---|---|---|
| *G05F 1/575* | (2006.01) | |
| *G05F 1/153* | (2006.01) | |
| *G05F 1/565* | (2006.01) | |
| *G05F 1/567* | (2006.01) | |

(52) U.S. Cl.
CPC ............. *G05F 1/575* (2013.01); *G05F 1/153* (2013.01); *G05F 1/565* (2013.01); *G05F 1/567* (2013.01)

(58) Field of Classification Search
CPC .......... G05F 1/153; G05F 1/565; G05F 1/567; G05F 1/575; H02M 2001/0025; H02M 2001/0045
USPC ....................................................... 363/132
See application file for complete search history.

(56) References Cited

U.S. PATENT DOCUMENTS

| | | | | |
|---|---|---|---|---|
| 5,485,077 | A * | 1/1996 | Werrbach ................ | G05F 1/565 323/285 |
| 7,093,143 | B2 * | 8/2006 | Ito .......................... | G06F 30/30 713/300 |
| 7,538,535 | B2 * | 5/2009 | McDonald ............ | H02M 1/143 323/286 |
| 8,054,057 | B2 * | 11/2011 | Dash ...................... | G01R 31/40 323/282 |
| 9,151,804 | B2 * | 10/2015 | Orendi ............. | G01R 31/31721 |

(Continued)

OTHER PUBLICATIONS

Momtaz et al., "On-line diagnosis and compensation for parametric failures in linear state variable circuits and systems using time-domain checksum observers," 2017 IEEE 35th VLSAI Test Symposium, 6 pages.

(Continued)

*Primary Examiner* — Yemane Mehari (57) ABSTRACT

The disclosure relates to voltage regulators and more specially voltage regulators including error detection and correction mechanisms. Example embodiments include a voltage regulator comprising: an input arranged to receive a trim signal used to specify a target voltage at an output of the regulator; a comparator arranged to compare a voltage derived from the trim signal to the voltage at the output of the regulator; a filter arranged to filter an output of the comparator; a checksum module comprising first and second portions arranged to calculate first and second checksums respectively from a plurality of states associated with the voltage regulator and to provide an error signal equal to the difference between the first and second checksums; and an adjustment module arranged to receive the error signal and adjust one or more of the plurality of states if the error signal is non-zero.

20 Claims, 9 Drawing Sheets

(56) References Cited

U.S. PATENT DOCUMENTS 9,940,191 B2* 4/2018 Abali .................. H03M 13/09

OTHER PUBLICATIONS

Nair et al., "Real-Number Codes for Fault-Tolerant Matrix Operations on Processor Arrays," IEEE Transactions on Computers, vol. 39, No. 4, Apr. 1990, 10 pages.
Cimpoesu et al., "State-space parameter estimation for closed-loop fault detection and identification," 17th International Conference on System Theory, Control and Computing, Oct. 11-13, 2013, 6 pages.
Banerjee et al., "Design of low cost fault tolerant analog circuits using real-time learned error compensation," 19th IEEE European Test Symposium, May 26-30, 2014, 2 pages.
Wu et al., "Characterization of Changes in LDO Susceptibility After Electrical Stress," IEEE Transactions on Electromagnetic Compatibility, vol. 55, Issue 5, Oct. 2013, 8 pages.
Haralampos et al., "Concurrent error detection in linear analog circuits using state estimation," Internation Test Conference, 2003, 10 pages.
Jeong et al., "Built-in self-test for stability measurement of low dropout regulator," 2017 IEEE International Test Conference, 9 pages.
Wang et al., "Mitigation of NBTI induced performance degradation in on-chip digital LDOs," 2018 Design, Automation & Test in Europe Conference & Exhibition, 6 pages.
Kim et al., "A diagnosis method of DC/DC converter aging based on the variation of parasitic resister," INTELEC 2009, 31st International Telecommunications Energy Conference, 5 pages.
Data sheet MC 34716, 1.0 MHz dual switch-mode DDR power supply, NXP https://www.nxp.com/docs/en/data-sheet/MC34716.pdf, downloaded Sep. 11, 2019, 34 pages.
Data sheet MC33394, Switch Mode Power Supply with Multiple Linear Regulators and High Speed CAN Transceiver, NXP, https://www.nxp.com/docs/en/data-sheet/MC33394.pdf.
Chatterjee, Abhijit, "Checksum-Based Concurrent Error Detection in Linear Analog Systems with Second and Higher Order Stages", 1992 VLSI Test Symposium Digest of Papers, Apr. 7, 1992, pp. 286-291, IEEE, Piscataway, NJ, USA, 6 pages.
Chatterjee, Abhijit, "A New Approach to Fault-Tolerance in Linear Analog Systems Based on Checksum-Coded Space Representations", Proceedings of the International Conference on Computer Design : VSLI, Oct. 11, 1992, pp. 478-481, IEEE, Piscataway, NJ, USA, 4 pages.

* cited by examiner

VOLTAGE REGULATOR ERROR DETECTION AND CORRECTION

FIELD

The disclosure relates to voltage regulators and more specially voltage regulators including error detection and correction mechanisms.

BACKGROUND

DC voltage regulators (VRs) in modern integrated circuits (ICs) are complex circuits that convert a higher input voltage to a lower output voltage. They can be categorized as low-dropout voltage regulators (LDOs) and DC-DC converters. VRs are typically characterized by a number of parameters including, but not limited to: the output voltage accuracy, the maximum overshoot and/or undershoot of the output voltage when the VR is subject to a fast change in load, and the ability of the VR to reject ripple in the input voltage.

One study performed on an LDO has shown that the response time to load changes increased by between 8.7% to 12.9% due to negative-bias temperature instability (NBTI) caused by five years of aging in a 32 nm process device. Another study has shown that several parameters linked to the regulation capabilities of an LDO worsened on the order of 4 dB after application of standard aging conditions in a 90 nm process device. A further study has shown that the equivalent series resistance of the main capacitor of a DC-DC converter increased by a factor of 11 during aging.

Testing VR parameters is of paramount importance, both at the time of fabrication of the VR and when in use in an application. In addition to detecting changes in these parameters (i.e. errors) arising in a given VR, it would also be desirable to apply error correction to minimize VR parameter fluctuations over the lifetime of the VR.

Concurrent error detection and correction based on state-space representation using analogue checksums is known for use in some analogue circuits, but not for VRs. This may be because known error detection and correction techniques based on analogue checksums are not directly suitable for use with VRs.

With the introduction of DVFS (Dynamic Voltage and Frequency Scaling), VRs are required to provide a large number of discrete, selectable output voltages, each with a different transfer function both of the VR and of the load. Further, in DC-DC converters, the switching cycle is divided into a portion where the load is powered by an inductor (where the voltage is slightly increasing), and a portion in which the load is powered by a capacitor (where the voltage is slightly decreasing). These factors present challenges when implementing error detection and correction in VRs.

It is therefore an object of the present disclosure to provide a VR having concurrent error detection and correction based on state-space representation using analogue checksums which can operate both at the time of fabrication and in the field when the VR is in use in a particular application.

SUMMARY

According to a first aspect there is provided a voltage regulator, comprising:
an input arranged to receive a trim signal used to specify a target voltage at an output of the regulator;
a comparator arranged to compare a voltage derived from the trim signal to the voltage at the output of the regulator;
a filter arranged to filter an output of the comparator;
a checksum module comprising first and second portions arranged to calculate first and second checksums respectively from a plurality of states associated with the voltage regulator and to provide an error signal equal to the difference between the first and second checksums; and
an adjustment module arranged to receive the error signal and adjust one or more of the plurality of states if the error signal is non-zero.

The plurality of states associated with the voltage regulator may comprise one or more states of the filter, and the voltage at the output of the regulator. The one or more states of the filter may comprise a voltage across a capacitor of the filter and/or a current through an inductor of the filter.

The second portion of the checksum module may be arranged to calculate the second checksum adaptively, in a manner dependent on the trim signal. The second portion of the checksum module may implement a matrix operator in a state-space representation which is dependent on the trim signal, the matrix operator being implemented by an analogue circuit configured to perform voltage addition or subtraction operations.

The voltage regulator may further comprise a transistor connected to an output of the filter and between the input and output of the regulator. The transistor may be a FET.

The voltage regulator may further comprise a buck converter connected between an output of the filter and the output of the regulator, wherein the second portion of the checksum module is arranged to calculate the second checksum adaptively, in a manner dependent on a switching state of the buck converter. The second portion of the checksum module may implement a matrix operator in the state-space representation, the matrix operator being implemented by an analogue circuit configured to perform voltage addition or subtraction operations. The analogue circuit, and hence the matrix operation represented by it, is dependent on a switching state of the buck converter.

The adjustment module may comprise a feedback factor adjustment circuit arranged to control the level of adjustment applied to one or more of the plurality of states. This enables optimal error correction to be provided while preventing a decrease in system stability that could result in oscillation.

The voltage regulator may further comprise a digital to analogue converter arranged to convert the trim signal to provide said voltage derived from the trim signal.

The adjustment module may be arranged to adjust one or more of the plurality of states if the error signal is above a specified threshold greater than zero.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
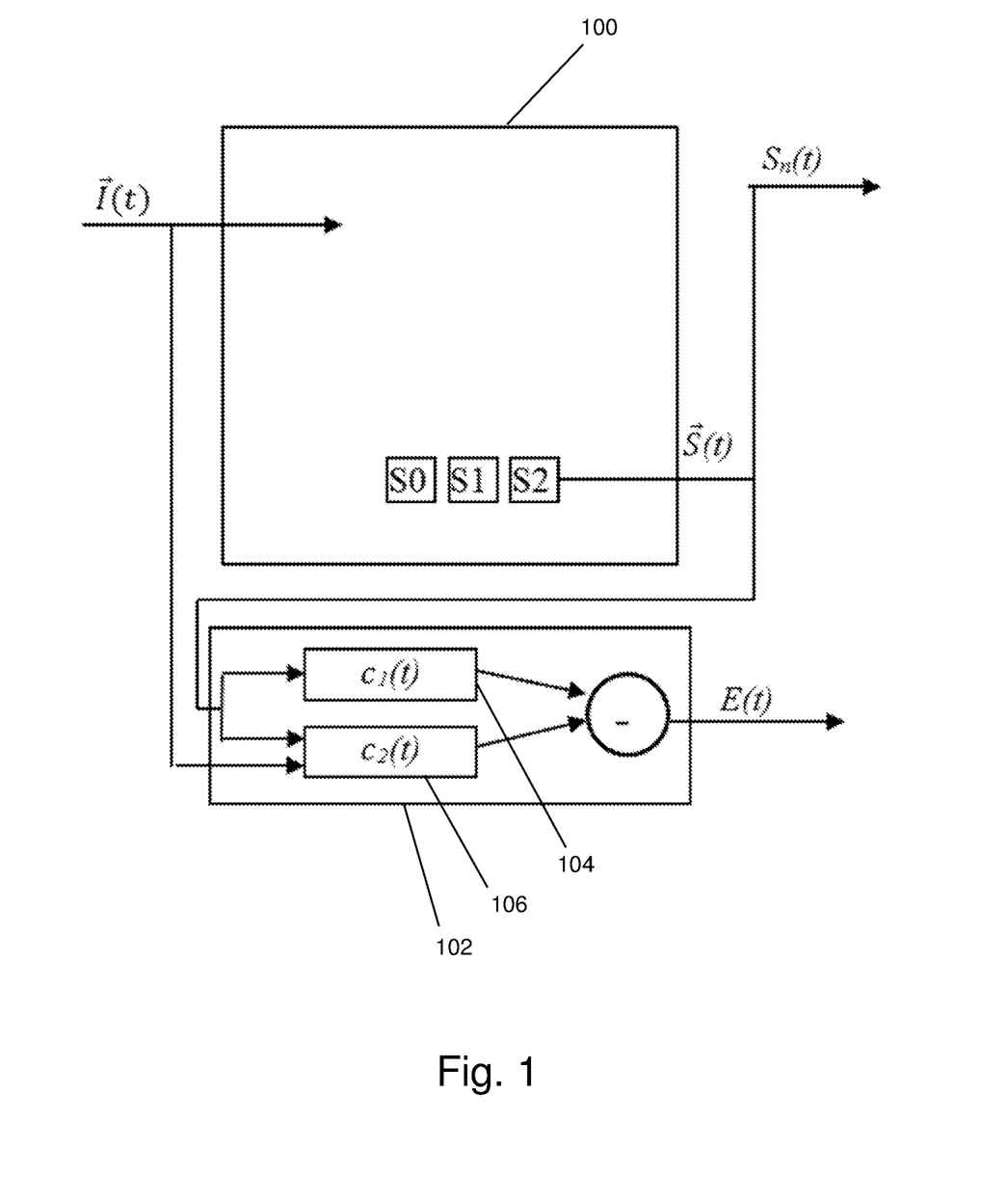
FIG. 1 illustrates schematically a linear system in the state-space representation, the system including a checksum module to produce an error signal.

With reference to FIG. 1, state-space representation is a way to describe a linear system, such as a linear electronic circuit 100, by first-order differential equations. In an electronic circuit the state variables S0, S1, S2 etc. may be the voltages across capacitors and the currents through inductors. A set of such differential equations (N.B. the vector notation which therefore indicates a set) can be written as:

$$\vec{S}(t) = A \cdot \vec{S}(t) + B \cdot \vec{I}(t) \qquad (1)$$

where $\vec{S}(t)$ is the state variable vector, $\vec{I}(t)$ is a vector of inputs to the circuit 100 and A and B are matrices representing coefficients dependent on parameters of the circuit. The output of the circuit is usually one of the state variables $S_n(t)$. Under parametric deviations/variations in the circuit, the values of the system matrices A and/or B change, resulting in modification of the circuit response. This change of A and/or B can be monitored by two analogue checksums. The idea and the notion of analogue checksums is taken from digital checksums where a one-dimensional checksum is derived from a vector containing a set of values, and a modification of this vector leads to a modification of the checksum. Accordingly, supervising the checksum is generally sufficient to check if the actual vector has been modified or not. In the system of FIG. 1, a checksum module 102 has a first portion 104 and a second portion 106. The first and second portions are arranged to calculate checksums $C_1(t)$ and $C_2(t)$ respectively which, according to an example, are given by:

$$C_1(t) = \vec{V} \cdot \vec{S}(t) \qquad (2)$$

$$C_2(t) = (\vec{V} \cdot A) \cdot \vec{S}(t) + (\vec{V} \cdot B) \cdot \vec{I}(t) \qquad (3)$$

For weighting its input signals, the checksum module 102 uses a constant coding vector V that can be chosen arbitrarily, but is preferably chosen such as to provide minimum error due to noise. It can be proven that $C_1(t)$ and $C_2(t)$ need to be equal to each other at all time. As such, an error signal E(t) can be defined as the difference of the two checksums such that:

$$E(t) = C_1(t) - C_2(t) \qquad (4)$$

For error detection purposes, E(t) is evaluated and compared to a certain threshold value. A value of E(t) above this threshold is taken as an indication that a failure or parametric deviation has occurred which is outside of a tolerated range.

The vectors $\vec{V} \cdot A$ and $\vec{V} \cdot B$ need only be calculated once in the second portion 106 of the checksum module 102 and therefore the evaluation of $C_2(t)$ is significantly easier and requires a less complex analogue circuitry than solving the full set of state equations given by equation (1). This means that the checksum module 102 can in general be much smaller in circuit size and complexity than the linear system/electronic circuit 100 which it monitors. It should be appreciated that the analogue checksums $C_1(t)$ and $C_2(t)$ are analogue voltage signals which can be created with high bandwidth and accuracy. The creation of analogue checksums as disclosed herein is advantageous for use with analogue electronic circuits, such as voltage regulators and the like, as is expanded on below in more detail.

Figure 2:
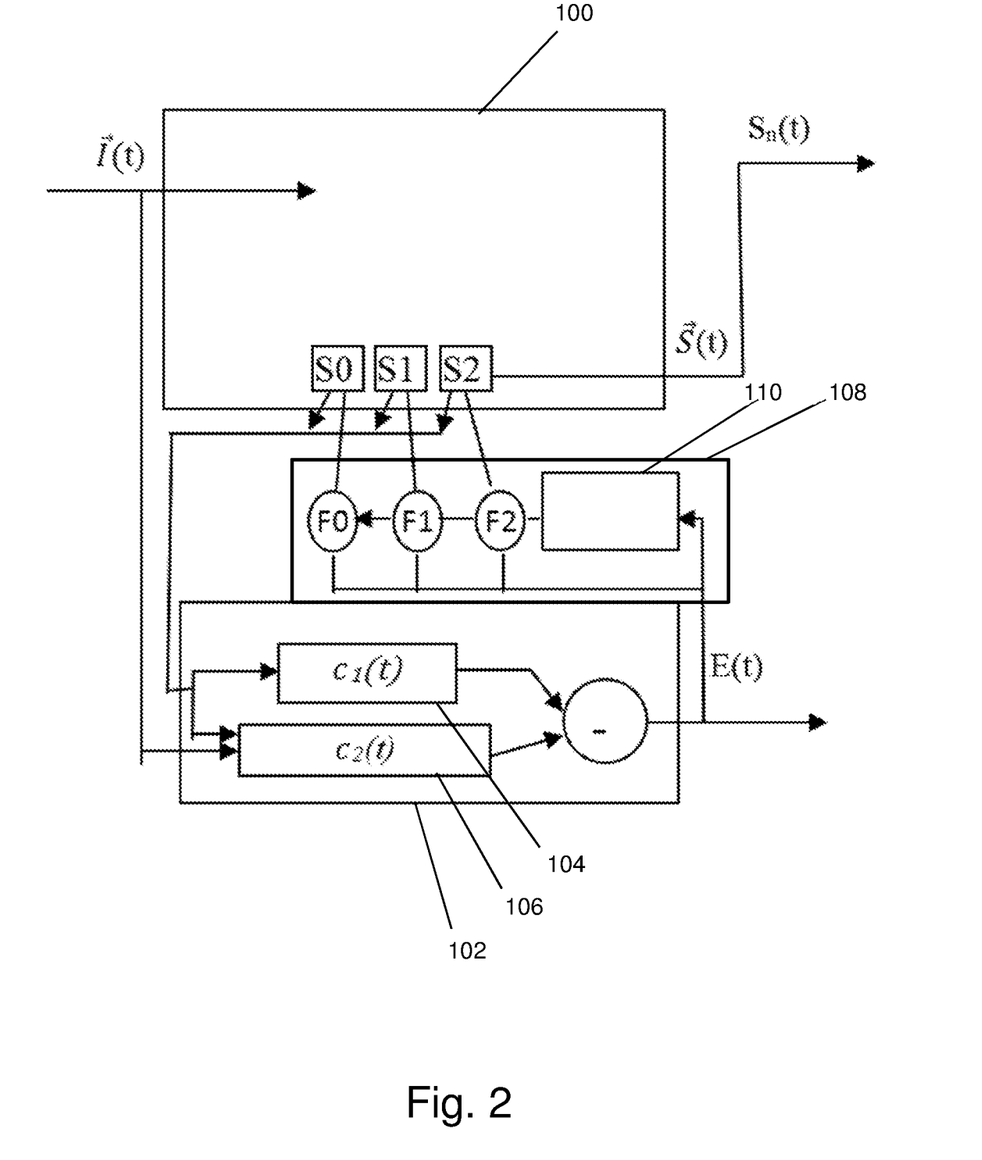
FIG. 2 illustrates schematically a linear system in the state-space representation, the system including a checksum module to produce an error signal and a feedback adjustment circuit to perform error correction.

As well as being useful for detecting errors, it has been appreciated by the inventor that the error signal E(t) described above can also be used to at least partially compensate parametric deviations, noise and crosstalk arising within an electronic circuit. In this regard, FIG. 2 illustrates an extension of the system of FIG. 1 which additionally comprises an adjustment module 108 arranged to receive the error signal E(t) from the checksum module 102 and adjust one or more of the plurality of state variables S0, S1, S2 etc. of the electronic circuit 100 if the error signal E(t) is non-zero. The number of state variables, and thus also of the number of corresponding feedback factors, F0 . . . F2, is arbitrarily assumed to be 3 in the example of FIG. 2 but could be any number as dictated by the application requirements and complexity of the circuit being monitored by the checksum module 102. A feedback factor adjustment circuit 110 within the adjustment module 108, which may for example be realized by a CPU, sets the feedback factors F0, F1 and F2 such that the averaged root-mean square value of E(t) (for example averaged over a few signal periods) becomes minimal. The feedback factors need to be adjusted so as to prevent a decrease in stability that may lead to oscillation. For example, the feedback factors may be adjusted from a starting value of zero and may then slowly be increased. As soon as the first signs of decreased phase margin are measurable as an increase of averaged E(t) (i.e. indicating that further increasing the feedback factor could lead to instability), the adjustment process may be stopped and re-started at zero, inverting the sign of the feedback factor.

Figure 3:
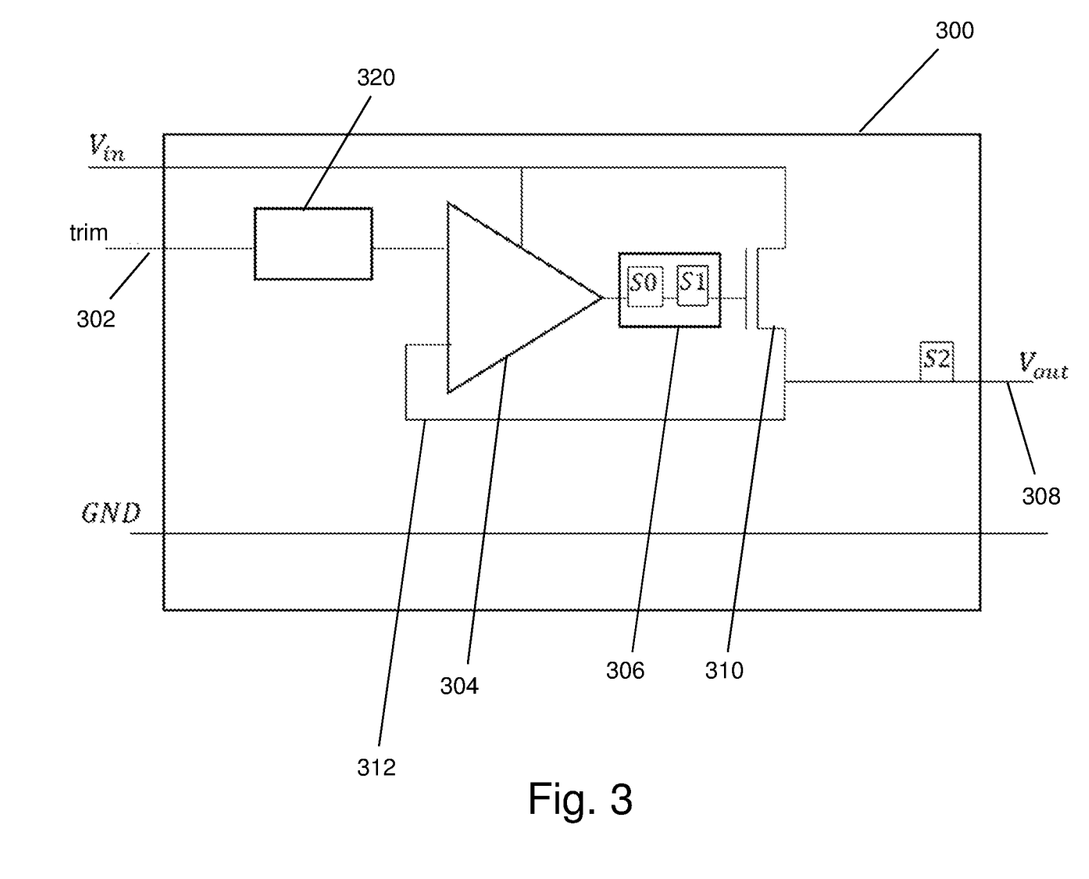
FIG. 3 is a block diagram of an LDO including a voltage trim input, a comparator, a filter, and an output, where several example system states characterizing the LDO are indicated.

The present disclosure is particularly concerned with the application of analogue checksums and the state-space representation for error detection and correction in VRs and specifically both linear regulators and switching regulators. FIG. 3 is a block circuit diagram of an exemplary low-dropout voltage regulator (LDO) 300, which is a specific type of voltage regulator and which includes a trim input 302 for setting the target output voltage of the regulator 300, a comparator 304, a filter 306, and an output 308, where several example system state variables S0, S1 and S2 of the LDO are indicated. S0 and S1 are internal states of the filter (e.g. voltages and currents across/through components of the filter such as capacitors and inductors) and S2 is the output voltage of the regulator. The LDO additionally comprises a transistor 310 connected to an output of the filter which provides buffering of the filter output and increases the available power output to a load supplied by the regulator 300, although it should be appreciated that in other examples the output of the filter may be used directly as the output of the regulator without requiring such an output transistor. The comparator 304 is arranged to receive a first voltage signal derived from the trim input 302 and a second voltage signal from an output of the regulator, e.g. from the output of the filter 306 or transistor 310 via a feedback loop 312. The trim input is usually a digital code which is converted to an analogue voltage level using a digital to analogue converter (DAC) 320. The output of the DAC 320 is the aforementioned first voltage signal (derived from the trim signal) and is fed to the comparator 304. In some examples, the LDO 300 may not have a DAC 320 and instead an analogue trim input voltage may be directly supplied to an input of the LDO 300 and fed directly to the comparator 304. The filter 306 is arranged to receive an output of the comparator 304 and to apply a filtering operation to it. The LDO 300 also has a voltage input Vin which is used to power the comparator 304 and the transistor 310, as well as a ground potential input GND for reference. The trim signal is used to specify the target output voltage $V_{out}$ of the regulator and may be varied in a given application such as dynamic voltage and frequency scaling (DVFS) applications.

Figure 4:
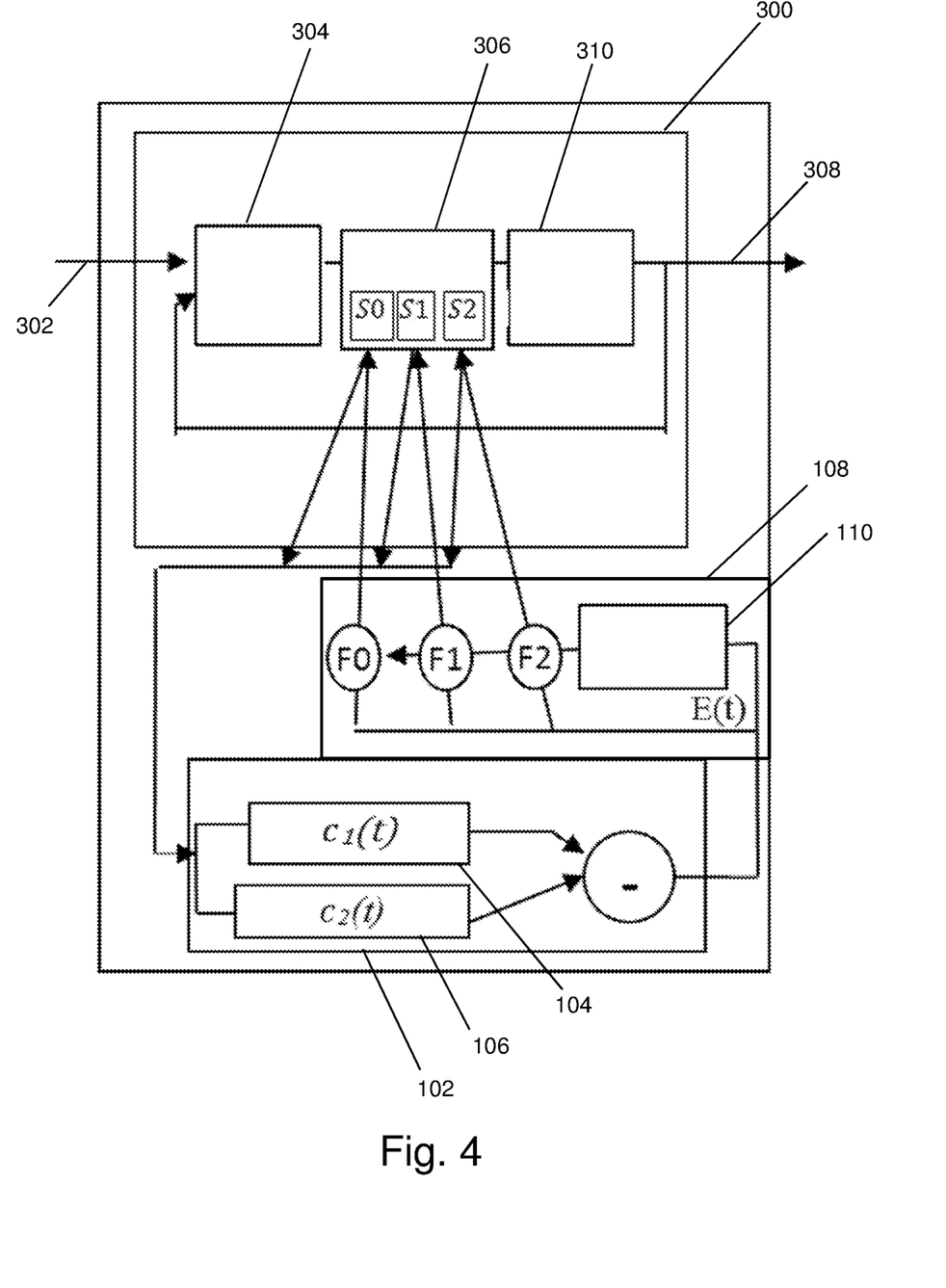
FIG. 4 illustrates schematically error detection and correction applied to the LDO of FIG. 3 in the state-space representation.

The LDO 300 can be characterized by a number of states S0, S1 and S2. As an example, in FIG. 3 S0 and S1 are internal states of the filter 306 and S2 is the output voltage $V_{out}$ of the regulator/filter. There could be several more internal states and the choice of three is purely exemplary. FIG. 4 is a block diagram which shows the LDO 300 of FIG. 3 in addition to a checksum module 102 and adjustment module 108 similar to those described above with reference to FIGS. 1 and 2. In FIG. 4, S2 is shown being associated with the filter 306. In other examples S2 may instead be associated with the output 308. The checksum module 102 comprises first and second portions 104 and 106 respectively, which are arranged to calculate first and second checksums $C_1(t)$ and $C_2(t)$ respectively from the plurality of states S0 . . . S2 to provide an error signal E(t) equal to the difference between the first and second checksums. $C_1(t)$ and $C_2(t)$ are, for example, given by the expressions of equations (2) and (3) above. The choice of the matrix A will be expanded on below. The adjustment module 108 is arranged to receive the error signal $E(t)=C_1(t)-C_2(t)$ from the checksum module 102 and adjust one or more of the plurality of states S0 . . . S2 if the error signal E(t) is non-zero or at least above a pre-determined threshold indicating that a parametric deviation/fault has occurred in the LDO 300. According to this example, a feedback factor adjustment circuit 110 within the adjustment module 108 sets feedback factors F0, F1 and F2 associated with respective states S0, S1 and S2 in the manner described above. In other examples the voltage regulator error correction can operate with pre-set, fixed feedback factors.

Figure 5:
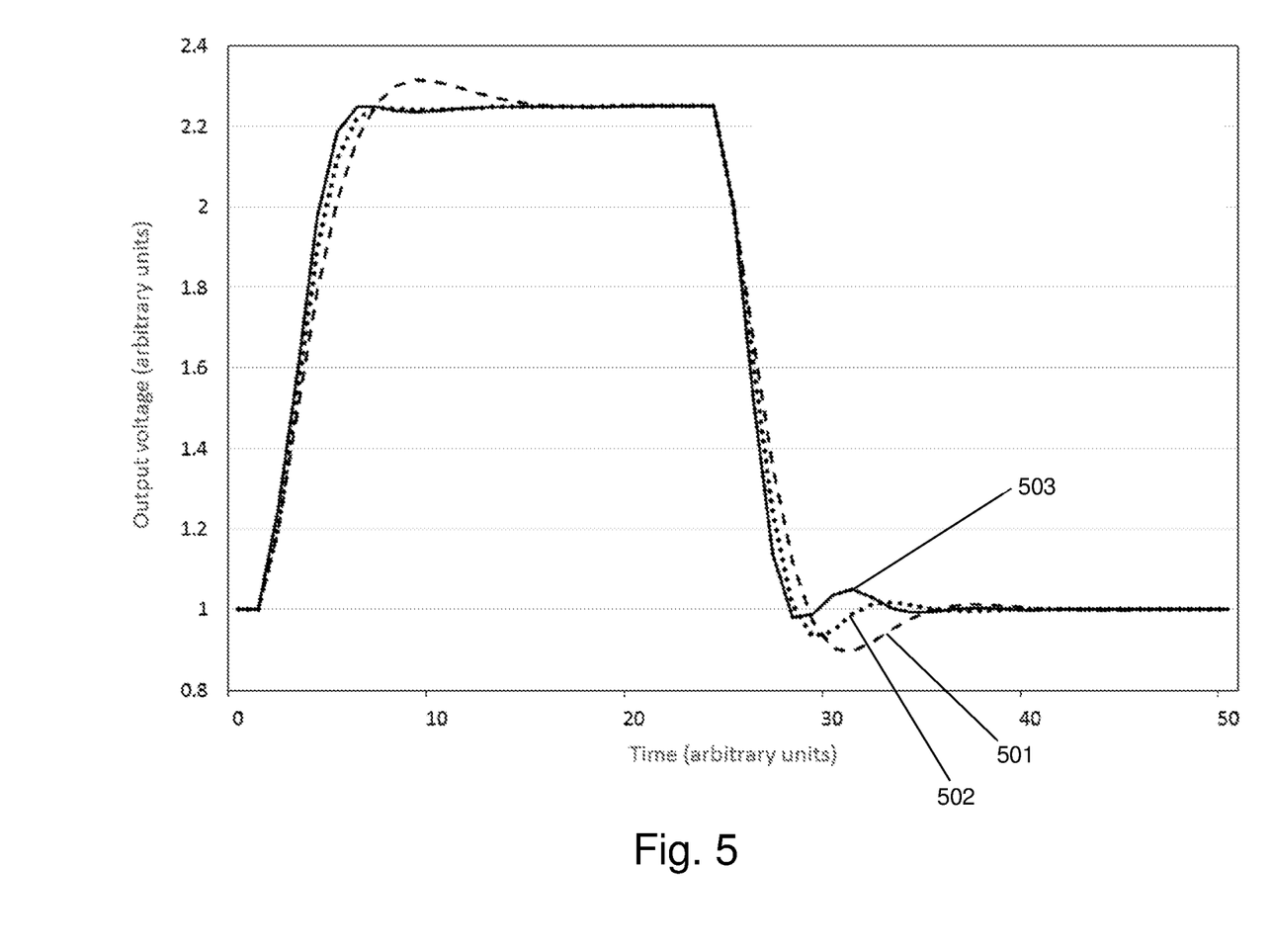
FIG. 5 shows simulation results for error correction applied to an LDO.

Simulation results are shown in FIG. 5 for error compensation in an LDO according to the present disclosure and based on the type of circuit shown in FIG. 4. The output voltage behaviour of the LDO 300 when subjected to a sudden change of the trim voltage input was simulated for three different cases. Firstly, the LDO was modelled without any correction being applied, i.e. without the use of a checksum module 102 and adjustment module 108 being operative in the manner as described above, with the results shown as line 501 in FIG. 5. Secondly, the LDO was modelled with error detection and correction using a checksum module 102 and adjustment module 108 operative in the manner described above and based on a single set of differential equations such as the set indicated in equation (1), i.e. a single, constant matrix A is used in the expression for $C_2(t)$ of equation (3). The results are shown as line 502 in FIG. 5. Finally, the LDO was modelled with error detection and correction using a checksum module 102 and adjustment module 108 operative in the manner described above and based on two different sets of differential equations. Specifically, a different set of differential equations was used for each of the two trim settings used in the simulation. In other words, a different matrix A was used in the previous equations for each of the two trim settings used in the simulation. In this manner, the error compensation can be considered to be "state aware", since the second portion 106 of the checksum module 102 comprises a matrix operator A which is dependent on a value of the trim voltage. The results are shown as line 503 in FIG. 5.

In the simulation shown in FIG. 5, the trim voltage setting was increased from an assumed minimum to a maximum value of a modern dynamic voltage and frequency scaling (DVFS) system. The trim setting was increased suddenly at time slice 4, left constant for 20 time slices, and then decreased again to its original value. The load on the regulator was assumed to draw a current proportional to the square of the supply voltage (due to increased clock frequency at increased supply voltage). This nonlinear behaviour of load current vs. load voltage leads to different overshoot/undershoot behaviour when suddenly increasing the voltage setting, versus suddenly decreasing the voltage setting. As can be seen in the simulation results of FIG. 5, the LDO with uncorrected, fixed feedback (line 501) shows a larger over/undershoot and takes longer to settle that the LDO with corrected feedback (lines 502 and 503). Moreover, in case of the state-aware correction (i.e. matrix A additionally being dependent on the trim setting, line 503), the overshoot/undershoot is still lower, and settling is even faster because the different (non-linear) behaviour of load current vs. load voltage can be taken into account with the state-aware correction. However, it should be noted that the performance of the regulator based on a single matrix A, line 502, is still better than the case where no correction is applied in terms of overshoot/undershoot. This simulation demonstrates that applying analogue checksum based error compensation to the LDO provides a performance improvement compared with the uncompensated case, even when a single matrix A is used, but particularly when different matrices A are used to take into account variations in the voltage trim setting applied to the LDO.

Figure 6:
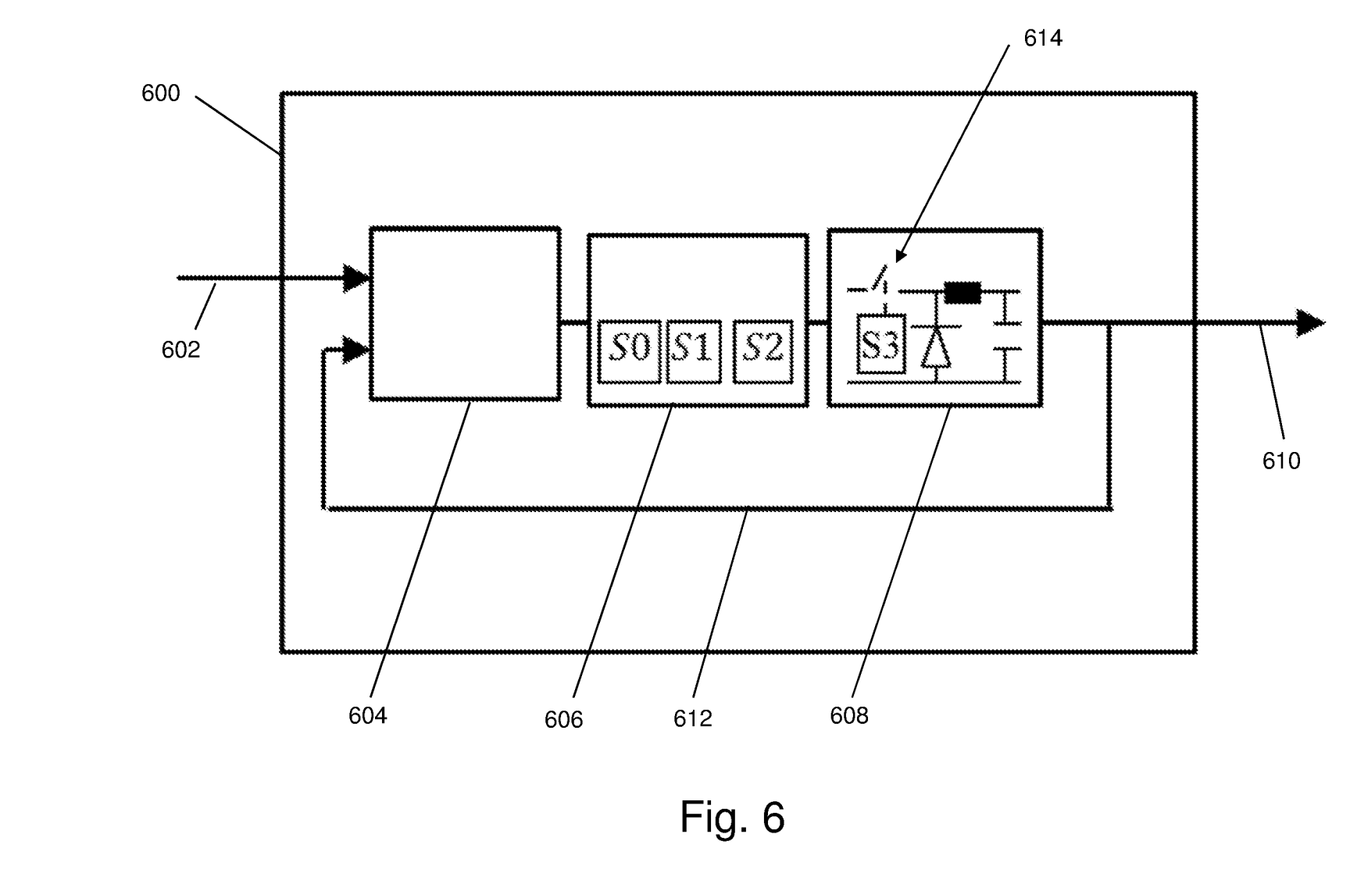
FIG. 6 is a block diagram of a switched-mode DC-DC converter including a voltage trim input, a comparator, a filter and a buck converter providing an output, where several example system states characterizing the switched-mode DC-DC converter are indicated.

DC-DC converters are another type of voltage regulator relevant to the present disclosure. A block diagram of a switched-mode DC-DC converter 600 is shown in FIG. 6. The DC-DC converter 600 has a comparator 604 which receives both an input voltage trim signal 602 (e.g. either directly or via a digital to analogue converter as described above) and an output 610 of a buck converter 608 via a feedback line 612. Between the buck converter 608 and the comparator 604 is a filter 606 characterized by a number of internal states S0 . . . S2. The buck converter is characterized by state variable S3. The state variable S3 of the buck converter represents the switching state of switch 614, which is periodically opened and closed to control the output 610. The transfer behaviour of the DC-DC converter from the comparator output S0 to the filter output voltage S2 is a function of S3. However, S3 is not determined by the set of states S0 . . . S2 itself, but changes as a function of time as the switch 614 is opened and closed. The set of differential equations (1) in the state space representation can therefore not be applied directly but modifications are required to realize a model that can be treated with a set of differential equations such as equation (1). According to the present disclosure, this is done by having a first complete set of differential equations such as the set of equations (1) for the case "switch S3=0" (open) and a second complete set of differential equations for the case "switch S3=1" (closed). This can be realized by having the matrix A in equations (1) and (3) dependent on S3, i.e. such that A=A(S3).

Figure 7:
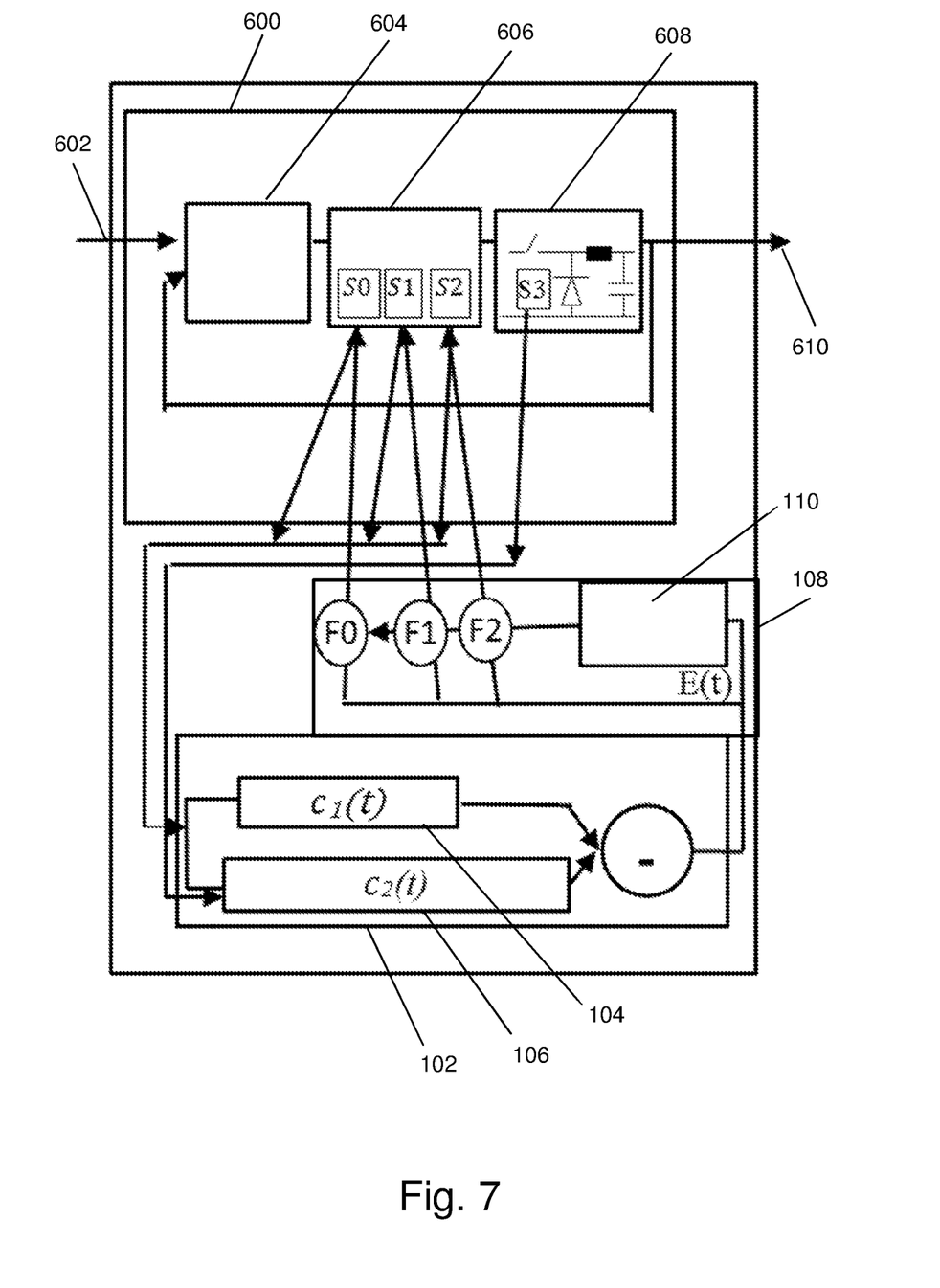
FIG. 7 illustrates schematically error detection and correction applied to the switched-mode DC-DC converter of FIG. 6 in the state-space representation.

FIG. 7 is a block diagram which shows the DC-DC converter 600 of FIG. 6 with the addition of a checksum module 102 and adjustment module 108 similar to those described above. The checksum module 102 comprises first and second portions 104, 106 arranged to calculate respective first and second checksums $C_1(t)$ and $C_2(t)$ from the plurality of states S0 . . . S3 to provide an error signal E(t) equal to the difference between the first and second checksums. In this example, since the matrix A is dependent on S3 the second checksum is given by:

$$C_2(t) = (\vec{V} \cdot A(S3)) \cdot \hat{S}(t) + (\vec{V} \cdot B) \cdot \vec{I}(t) \quad (5)$$

In this manner, the switch setting S3(t) is fed to the checksum module 102 to select one of the A(S3) transfer matrices.

Figure 8:
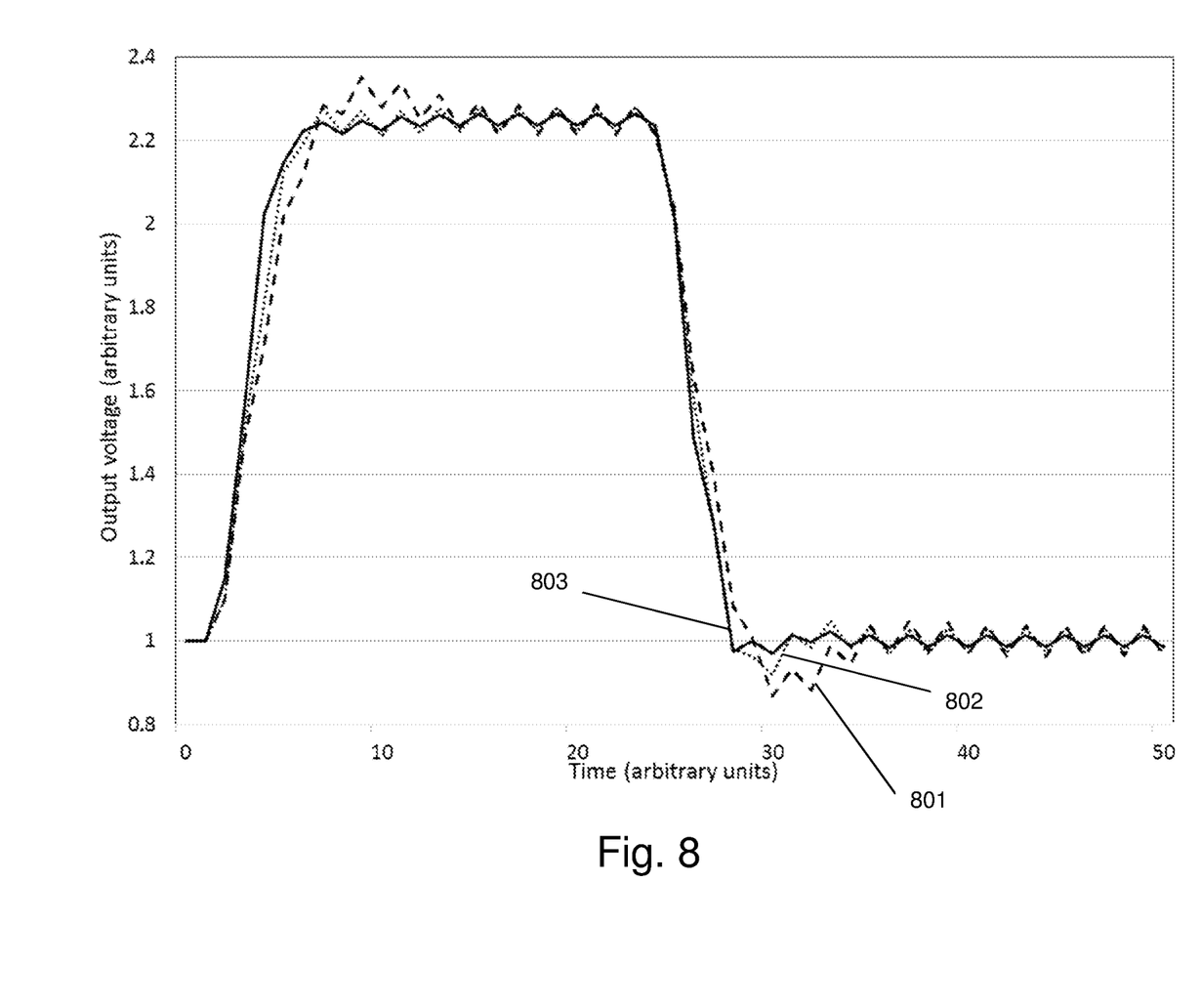
FIG. 8 shows simulation results for error correction applied to a switched-mode DC-DC converter.

Simulation results for error compensation in a DC-DC converter according to the present disclosure are shown in FIG. 8. The output voltage behaviour of the regulator when subjected to a sudden change of the trim voltage input was simulated for three different cases. The voltage trim setting was increased by approximately 125% (representing a typical range of a modern DVFS system) for 20 time slices, and then set back to its previous value. Firstly, the DC-DC converter was modelled without any correction being applied, i.e. without the use of a checksum module 102 and adjustment module 108 being operative in the manner described above. The results are shown as line 801 in FIG. 8. As can be seen, the output of the uncorrected DC-DC converter with fixed, uncorrected feedback shows a large over/undershoot and takes a long time to settle. Secondly, the DC-DC converter was modelled with error detection and correction using a checksum module 102 and adjustment module 108 operative in the manner described above and based on two sets of differential equations, i.e. where matrix A is dependent on state S3 as described above. The results are shown as line 802 in FIG. 8 and exhibit less overshoot/undershoot than the uncorrected case. Finally, the DC-DC converter was modelled with error detection and correction using a checksum module 102 and adjustment module 108 operative in the manner described above and based on the matrix A being dependent on the switching state of the buck converter S3, i.e. A=A(S3), in addition to the trim voltage, i.e. additionally incorporating the state aware aspects described above with reference to the LDO. The results are shown as line 803 in FIG. 8 and this correction exhibits the smallest overshoot/undershoot. The overshoot/undershoot is lowest and settling is fastest because the aforementioned different behaviour of load current vs. load voltage can be taken into account with the state-aware correction.

Figure 9A:
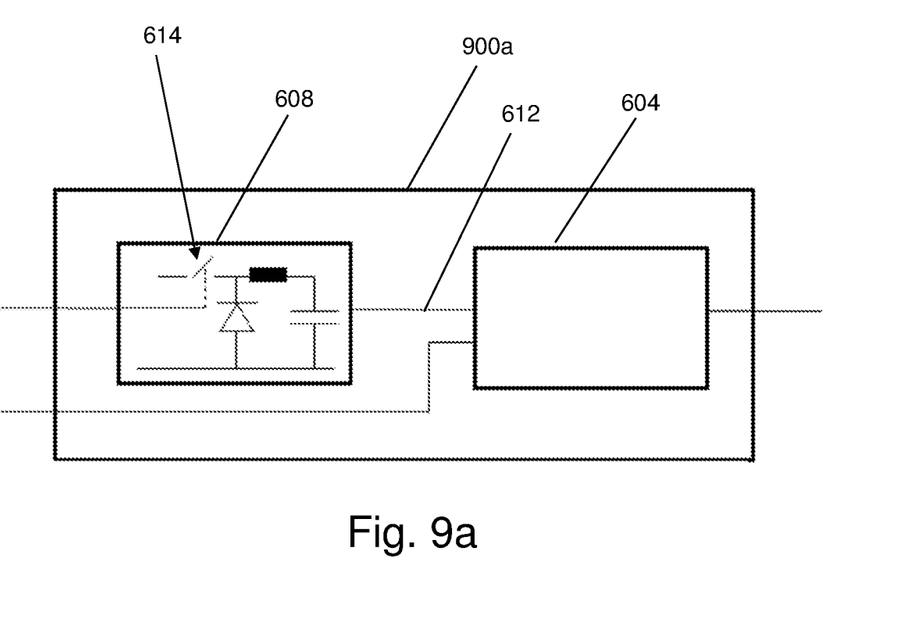
FIGS. 9a and 9b show a buck converter and comparator combination and an equivalent circuit used in a checksum module.
Figure 9B:
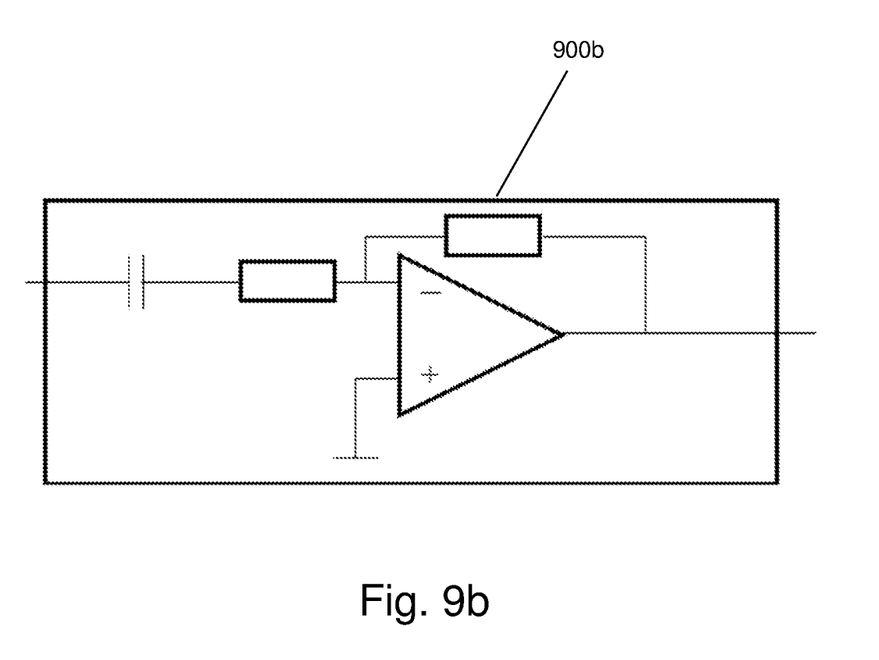

With reference to FIGS. 9a and 9b, an example buck converter 608 has as an input a binary signal (not shown) which controls the switching behaviour of the main switch 614 and also has an output voltage which is fed to the load and also back to the comparator 604 by a feedback loop 612. The combination of the buck converter and load 900a has a behaviour which is predominantly equivalent to an integrating plus proportional (PI) behaviour. Therefore the combination of the buck converter and load can be modelled in the checksum module 102 by a simple analogue integrator and amplifier which exhibits a similar PI behaviour to the real buck converter and load combination, shown as the equivalent circuit 900b in FIG. 9b. This analogue integrator and amplifier of the checksum module can be fed by the buck converter switching control input and the comparator voltage as output. It should be appreciated that the effective equivalent circuit 900b consisting of the analogue integrator and amplifier combination is much simpler, smaller and less power consuming than the actual buck converter, load and comparator—thereby limiting the circuit impact of the checksum module 102.

From reading the present disclosure, other variations and modifications will be apparent to the skilled person. Such variations and modifications may involve equivalent and other features which are already known in the art of error detection and correction, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A voltage regulator, comprising:
    an input arranged to receive a trim signal used to specify a target voltage at an output of the regulator;
    a comparator arranged to compare a voltage derived from the trim signal to the voltage at the output of the regulator;
    a filter arranged to filter an output of the comparator;
    a checksum module comprising first and second portions arranged to calculate first and second checksums respectively from a plurality of states associated with the voltage regulator and to provide an error signal equal to the difference between the first and second checksums; and
    an adjustment module arranged to receive the error signal and adjust one or more of the plurality of states if the error signal is non-zero.

2. The voltage regulator of claim 1, wherein the plurality of states associated with the voltage regulator comprises one or more states of the filter, and the voltage at the output of the regulator.

3. The voltage regulator of claim 2, wherein the one or more states of the filter comprise a voltage across a capacitor of the filter and/or a current through an inductor of the filter.

4. The voltage regulator of claim 1, wherein the second portion of the checksum module is arranged to calculate the second checksum adaptively, in a manner dependent on the trim signal.

5. The voltage regulator of claim 4, wherein the second portion of the checksum module implements a matrix operator in a state-space representation which is dependent on the trim signal, the matrix operator being implemented by an analogue circuit configured to perform voltage addition or subtraction operations.

6. The voltage regulator of claim 1, further comprising a transistor connected to an output of the filter and between the input and output of the regulator.

7. The voltage regulator of claim 6, wherein the transistor is a FET.

8. The voltage regulator of claim 1, further comprising a buck converter connected between an output of the filter and the output of the regulator, wherein the second portion of the checksum module is arranged to calculate the second checksum adaptively, in a manner dependent on a switching state of the buck converter.

9. The voltage regulator of claim 8, wherein the second portion of the checksum module implements a matrix operator in the state-space representation which is dependent on a switching state of the buck converter, the matrix operator being implemented by an analogue circuit configured to perform voltage addition or subtraction operations.

10. The voltage regulator of claim 1, wherein the adjustment module comprises a feedback factor adjustment circuit arranged to control the level of adjustment applied to one or more of the plurality of states.

11. The voltage regulator of claim 1, further comprising a digital to analogue converter arranged to convert the trim signal to provide said voltage derived from the trim signal.

12. The voltage regulator of claim 1, wherein the adjustment module is arranged to adjust one or more of the plurality of states if the error signal is above a specified threshold greater than zero.

13. A method of operating a voltage regulator, comprising:
receiving a trim signal used to specify a target voltage at an output of the voltage regulator;
comparing by a comparator a voltage derived from the trim signal to the voltage at the output of the voltage regulator;
filtering in a filter an output of the comparator;
calculating first and second checksums in respective first and second portions of a checksum module from a plurality of states associated with the voltage regulator and to provide an error signal equal to the difference between the first and second checksums; and
receiving the error signal in an adjustment module and adjusting one or more of the plurality of states if the error signal is above a specified threshold greater than zero.

14. The method of claim 13, wherein the plurality of states associated with the voltage regulator comprises one or more states of the filter, and the voltage at the output of the regulator.

15. The method of claim 14, wherein the one or more states of the filter comprise a voltage across a capacitor of the filter and/or a current through an inductor of the filter.

16. The method of claim 13, wherein the second portion of the checksum module is arranged to calculate the second checksum adaptively, in a manner dependent on the trim signal.

17. The method of claim 16, wherein the second portion of the checksum module implements a matrix operator in a state-space representation which is dependent on the trim signal, the matrix operator being implemented by an analogue circuit configured to perform voltage addition or subtraction operations.

18. The method of claim 13, further comprising a transistor connected to an output of the filter and between the input and output of the regulator.

19. The method of claim 18, wherein the transistor is a FET.

20. The method of claim 13, further comprising a buck converter connected between an output of the filter and the output of the regulator, wherein the second portion of the checksum module calculates the second checksum adaptively, in a manner dependent on a switching state of the buck converter.

* * * * *